April 25, 1967   M. E. BERGMAN   3,315,992
CONNECTOR
Filed June 7, 1965
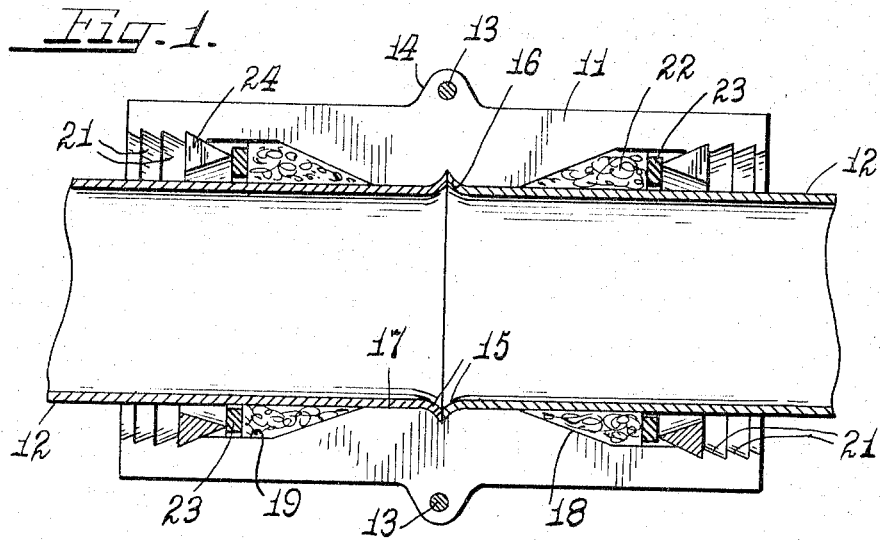
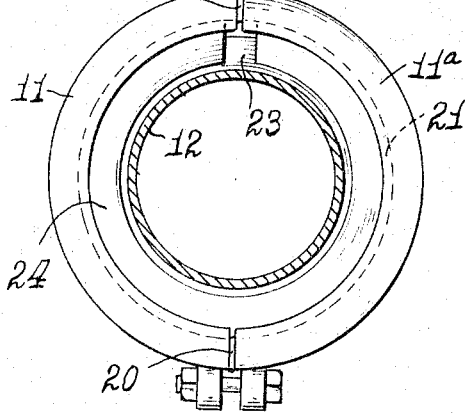
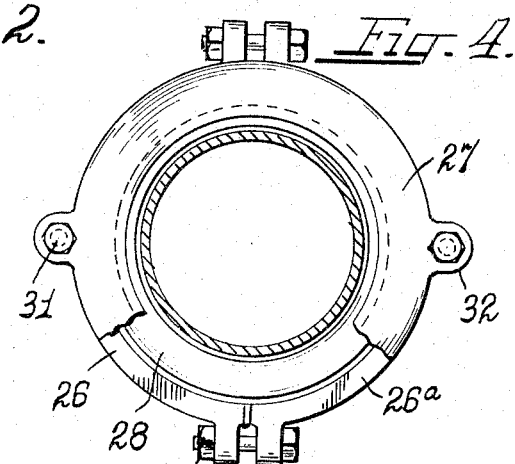
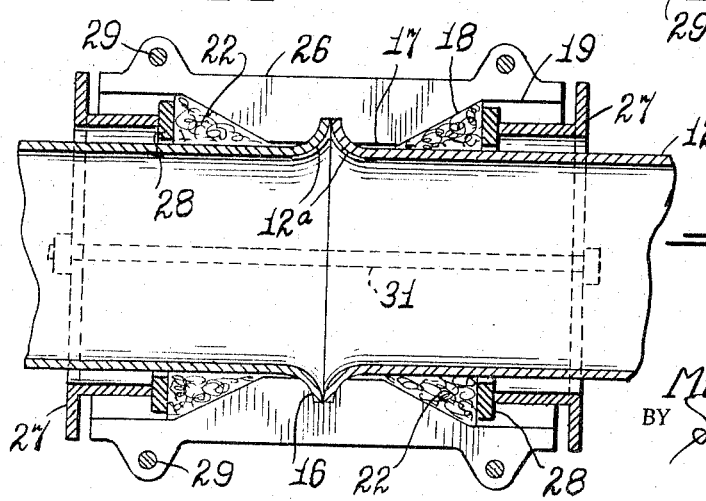
INVENTOR.
Michael E. Bergman
BY
ATTY.

_United States Patent Office_ 3,315,992
Patented Apr. 25, 1967

3,315,992
CONNECTOR
Michael E. Bergman, 8807 S. Commercial Ave.,
Chicago, Ill. 60617
Filed June 7, 1965, Ser. No. 461,639
2 Claims. (Cl. 285—373)

This invention relates to improvements in connectors for flared ends of tubes. The present application is a continuation in part of my application Ser. No. 252,176 filed Jan. 17, 1963, and now abandoned.

Heretofore, a great variety of connectors were proposed, and some of them used, but great difficulty was encountered when it was necessary to establish a leakproof connection and to maintain it in the presence of high fluid pressures, vibratory mechanical forces, and other heavy loads. For instance the well-known connectors for copper tubes, wherein flared tube ends are compressed between similarly flared connector surfaces held thereto by threaded fittings and the like, could withstand strong mechanical vibrations only by virtue of the flexibility of the connected tubes, and tended to fail when the tubes were relatively short and stiff. Connectors of the wrap-around type were proposed in various forms, but insofar as they are adapted to flared pipe or tube ends at all they generally engaged these ends with gasket sheets or the like, which had little or no mechanical strength, yielded to heavy mechanical loads, and soon began to leak as a result.

It is an object of this invention to provide an improved connector for flared tube or pipe ends, and particularly to avoid the shortcomings of former connectors. It is a further object to provide a connector which is inexpensive to make, easy to assemble and disassemble, and reliable in use.

Toward these objects the invention provides a new combination of wrap-around shell means, flared end engagement means therein, and packing compressing means. The shell unit has, from each end toward the middle, a wide cylindrical inside surface, a converging cone surface, and a narrow cylindrical surface with a flared end engaging groove therein, all of which will be described more fully hereinafter.

In the drawings appended hereto, FIGURE 1 is a longitudinal sectional view of one embodiment of this invention. FIGURE 2 is an elevational view of either end of the connector of FIGURE 1, showing the pipe in transverse section. FIGURES 3 and 4 are views similar respectively to FIGURES 1 and 2 and showing a modified embodiment of the invention.

The connector of FIGURES 1 and 2 comprises a longitudinally split and generally tubular body 11, 11a, having two halves of generally semicylindrical shape. These two halves 11, 11a are fitted around abutted end portions of pipes, hereinafter referred to as tubes 12, and are bolted together by bolts 13 that are engaged in lugs 14 on the longitudinal edges of the two halves. A gasket 20 is arranged between the halves 11, 11a to prevent leakage. The flared ends 15 of tubes 12 are seated in an internal circumferential groove 16 formed in connector 11, 11a, this groove being just wide enough to fit the flared ends into the same when the wrap-around body is assembled on the tubes. The grooved body thus provides means for holding the tube ends and the tubes against mechanical forces which tend to separate them and to interfere with the seating of the packing material to be described presently.

Adjacent to the aforesaid groove 16 the assembled connector body 11, 11a has a pair of inner surfaces 17 of relatively small internal diameter, each just fitting the outside diameter of the tube. These surfaces by means of their close fit contribute further to mechanical stability of the tube connected by the new connector. These surfaces 17 extend from groove 16, each toward one end of the connector. Starting at the end of each surface 17 remote from groove 16 the inside of the connector has a frusto-conical surface 18, expanding from said end of surface 17 towards the end of the connector, for the reception and compression of packing material. Between the wide end of the frusto-conical surface and the corresponding end of the connector the unit has a wide portion 19 for the introduction of said packing material, and for packing compressor means.

These latter means are here illustrated as comprising ratchet teeth 21 on inside surface portions of the wide connector end 19. The ratchet teeth have their inclined surfaces facing toward the nearest end of the connector, for a purpose to be indicated presently. Packing material 22 is placed in each frusto-conical portion 18 of the connector, and a washer 23, suitably fitted over the pipe end portion, is inserted between the outer end of the body of packing material and the adjacent connector end. In order to compress the packing material and to seal the pipe or tube connection thereby, a split ring 24 is provided for each connector end and washer, and is forcibly advanced into the wide portion 19 of the connector and over the ratchet teeth therein. In some cases this can be achieved by hammering the assembled split ring into connector portion 19. In any case it is caused to ride up the inclined surfaces of successive ratchet teeth 21, contracting while it does so and then expanding to be retained by the teeth.

When it is desired to disassemble the connector, bolts 13 are removed whereupon the two halves 11, 11a of the connector separate. Retainer rings, packing and pipes can then be removed.

The modified high pressure connector of FIGURES 3 and 4 comprises a two-piece body longitudinally split at 26–26a. This body is fitted over pipes 12 so as to receive flared ends 12a in the corresponding groove. Narrow, conically expanding and wide inside portions 17, 18, 19 are provided in this body, substantially as described above; packing 22 is again inserted in the conically expanding portion; and the packing is in this case compressed by an externally flanged ring 27 in each connector end, through the medium of a washer 28. To assemble the unit bolts 29 are tightened in lugs extending from the longitudinal edges of the split body, and bolts 31 extending through and between the flanges 32 of rings 27 are tightened to draw these rings toward one another and thus to compress the packing material, against frusto-conical sides 18 and thereby against the outside surfaces of the pipes.

One set or several sets of bolts 13, 29 can be arranged along the length of the connector, as may be required in view of fluid pressures and other conditions to be taken into account. While only two bolts 31 are shown, greater numbers of such bolts can of course be used, and when high pressures are involved, similar bolts can be engaged with adjacent ends of the connector body rather than with opposite flanges on compressor rings. Washers 23, 28 and rings 27 can either be circular and telescoped on the pipes or tubes, or can be split for instance in a way similar to that shown for rings 24.

In operation, a variety of forces are often encountered, such as high pressures of fluid in pipes 12, water hammer in such pipes, vibrations of pumps and other mechanisms propagated by the pipes into the connector, etc. The new connector withstands the seal-loosening and destructive influences of such forces with unprecedented effectiveness. Forces tending to separate the pipes or tubes are absorbed by the inner and grooved connector portions, in "metal-to-metal" contact with the pipe material, while forces tending to drive fluid out between abutting flares 15 or 12a are countered by the presence of tightly compacted packing material, adjacent these flares.

Various changes can be made in the embodiments described and illustrated herein, but within the teaching of my invention.

I claim:

1. A connector for tubes with outwardly flared ends in contact with one another, said connector comprising a generally tubular body having, from each end to the middle thereof, a first portion with inside diameter substantially larger than the outside diameter of the tubes to be connected, a second portion with frusto-conical inner surface converging toward the opposite end of the body, a third portion with inside diameter substantially fitting around the body of the tubes, and with a groove in said third portion, just large enough longitudinally of the tubes to fit said outwardly flared ends in such a way that said third portion holds the tube ends against forces tending to separate them; said tubular body being longitudinally split into two mutually similar halves and having means to hold said halves together and clamp said flared ends into said groove; and a pair of packing retainers, one associated with each first portion of said tubular body and fitting over the corresponding tube body for pressing packing material onto the corresponding frusto-conical surface and thereby onto the tube.

2. A connector as described in claim 1 wherein said means to hold said halves together comprises fastener means disposed along both longitudinal edges of each half.

References Cited by the Examiner

UNITED STATES PATENTS

| | | | |
|---|---|---|---|
| 544,943 | 8/1895 | Woodside | 285—419 |
| 631,867 | 8/1899 | Beaver | 285—373 |
| 740,004 | 10/1903 | Gillespie | 285—342 |
| 915,956 | 3/1909 | Hazlet | 285—383 X |
| 1,622,768 | 3/1927 | Cook | 285—356 |
| 2,189,350 | 2/1940 | Morris | 285—373 |
| 2,201,372 | 5/1940 | Miller | 285—342 |
| 2,203,237 | 6/1940 | Raybould | 285—348 |
| 2,383,010 | 8/1945 | Miller | 285—342 X |
| 2,775,469 | 12/1956 | Brown | 285—373 X |

FOREIGN PATENTS

| | | |
|---|---|---|
| 110,743 | 10/1928 | Austria. |
| 572,487 | 3/1933 | Germany. |
| 671,966 | 5/1952 | Great Britain. |

CARL W. TOMLIN, *Primary Examiner.*

EDWARD C. ALLEN, THOMAS F. CALLAGHAN,
*Examiners.*

R. GIANGIORGI, *Assistant Examiner.*